(No Model.)
F. C. FEICKER.
FORK GUARD.
No. 489,414. Patented Jan. 3, 1893.
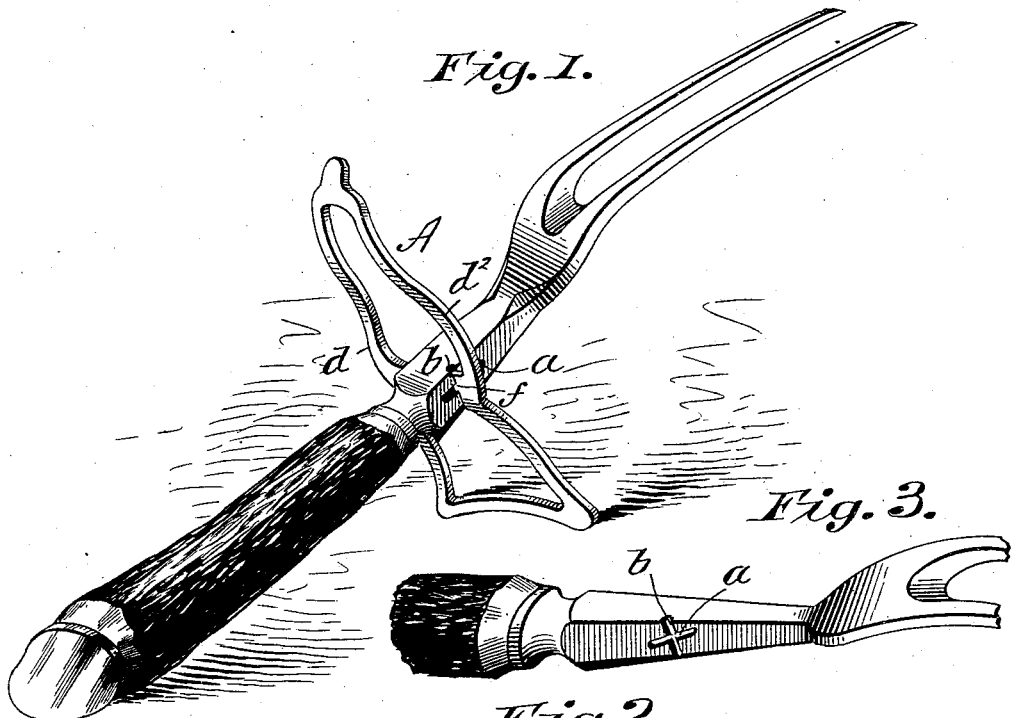
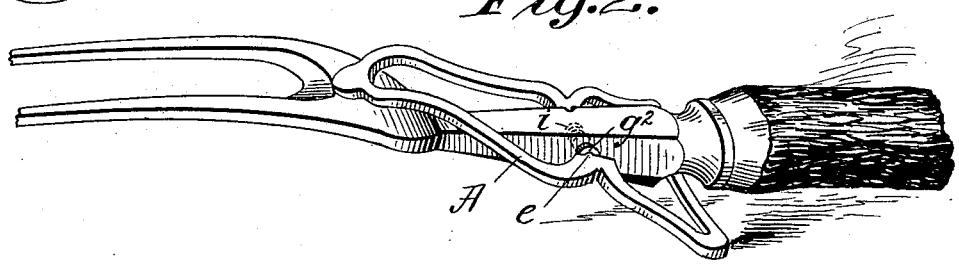
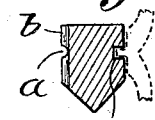 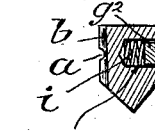
Witnesses:
J. D. Gaffield
J. K. J. Clemons
Inventor,
Fred'k C. Feicker,
per Chapin & Co
Atty's

UNITED STATES PATENT OFFICE.

FREDRICK C. FEICKER, OF NORTHAMPTON, MASSACHUSETTS.

FORK-GUARD.

SPECIFICATION forming part of Letters Patent No. 489,414, dated January 3, 1893.

Application filed April 25, 1892. Serial No. 430,455. (No model.)

*To all whom it may concern:*

Be it known that I, FREDRICK C. FEICKER, a citizen of the United States, residing at Northampton, in the county of Hampshire and State of Massachusetts, have invented new and useful Improvements in Fork-Guards, of which the following is a specification.

This invention relates to improvements in guards for carving forks.

The object of the invention is to provide a novel pivotally connected guard which is most simple and effective in operation, and cheap and practicable of construction.

To these ends the invention consists in the combination with the shank of a fork, having, at one side thereof, grooves which are arranged angularly to each other, and, at its other side, a small transverse socket which extends but partially through the shank, of a yoke-formed guard having one side member provided with an inwardly extended stud or teat, $e$, in pivotal engagement in said socket in the shank, and its other side member provided with the inwardly extended rib-like member, $f$, which is adapted, under the different positions of the guard to have engagements in one or the other of the said grooves, and said rib-provided guard member having a spring stress toward the grooved side of the shank whereby the rib and groove engagement may be maintained.

The invention is illustrated in the accompanying drawings, in which embodiments of the invention as aforesaid are shown as of varied or modified forms,—Figure 1 being a perspective view of one of the forms with the guard shown as in its open or fork-supporting position; Fig. 2 is a perspective view of a fork shown as in its folded down position, the said view indicating the modified construction. Fig. 3 is a perspective view indicating the provision at the side of a fork-shank of the angularly arranged grooves. Fig. 4 is a perspective view at one side of the shank of the fork shown in Fig. 2 the guard in this and the preceding figure being removed. Fig. 5 is a perspective view of the guard. Fig. 6 is a cross-section on the line 6—6, Fig. 4. Fig. 7 is a view of a fork-shank of the form shown in Fig. 1, but seen at its side opposite from that shown in Fig. 3. Fig. 8 is a cross-sectional view of the fork-shank last referred to, taken on the line 8—8 Fig. 7.

The fork-shank at its one side is provided with the grooves, $a\,b$, one of which extends about longitudinally of the fork, and in a direction corresponding to that of the guard, A, when the latter is in its most compact disposition, as shown in Fig. 2,—while the other groove, $b$, extends in a direction transversely of the length of the fork and corresponding to the length of the guard when it is in its position for the support of the fork indicated in Fig. 1.

The fork-guard, A, is of substantially a yoke form, the design or particular contour thereof being variable in the discretion of the constructer, and said guard has inwardly projected from an intermediate portion of its one-side member, $d$, a stud or teat, $e$, while the opposing side member, $d^2$, of the guard has the inwardly extended lug or rib-like member, $f$. A socket, $g$, is provided transversely within the side of the shank, opposite the position of the said grooves, into which the said stud may fit to constitute the pivotal connection and support of the guard with and upon the fork-shank. As particularly shown, the guard is of a conformation whereby it is readily capable of being struck out from spring-tempered steel, the distance between the inner edge of rib, $f$, and the base of the stud, $e$, being slightly less than the diameter of the shank at its place for receiving the connection therewith of the guard.

By springing the side members of the guard from each other sufficiently far, they may be caused to embrace the fork-shank, and the stud, $e$, may then be entered into the socket, $g$, therefor, the inherent spring reaction of the side-members of the guard imparting a sidewise stress or pressure of the rib member, $f$, against the grooved side of the fork-shank, retaining the said member with a yielding bearing in such engagement.

In the modification of the invention illustrated in Figs. 2, 4, and 6, the transverse pressure is imparted to maintain the yielding engagement between the rib, $f$, and the one or the other of the grooves, by the means therein shown, and to be now set forth as follows;—
The socket, $g$, for the reception of the stud, $e$, is formed in an axially socketed cylindrical piece, $g^2$, which is set within a socket, $h$, therefor in the side of the shank,—in the base of which socket is the spring, $i$, which acts to outwardly force the said cylindrical socketed piece. Under this construction the same result is attained, that is, the yielding pressure is established upon the fork-guard to cause the member, $f$, thereof to be in yielding engagement with the groove, $a$ or $b$ according to the position of the guard. In the latter described construction the guard members may, as will be readily understood, be without spring capabilities in and of themselves.

Having thus described my invention what I claim and desire to secure by Letters Patent is

The combination with the fork-shank, having at one side thereof, grooves which are arranged angularly to each other, and at its opsite side a transverse socket which extends but partially through the shank, of a yoke-formed guard having one side-member provided with an inwardly extended stud or teat, $e$, which has an engagement in said socket in the shank, and its other side member provided with the inwardly extended rib or lug, $f$, which is adapted, under the different positions of the guard, to have engagements in one or the other of the said grooves, and said rib-provided guard-member having a spring stress for yielding bearing toward the side of the shank, whereby the rib-and-groove engagement may be maintained, substantially as described.

FREDRICK C. FEICKER.

Witnesses:
OLIVE WALKER,
WM. S. BELLOWS.